(12) United States Patent
Furumiya et al.

(10) Patent No.: US 8,269,183 B2
(45) Date of Patent: Sep. 18, 2012

(54) RADIATION DETECTOR

(75) Inventors: Tetsuo Furumiya, Kyoto (JP); Junichi Ohi, Kyoto (JP); Hiroyuki Takahashi, Tokyo (JP); Kenji Shimazoe, Tokyo (JP)

(73) Assignees: Shimadzu Corporation, Kyoto (JP); The University of Tokyo, Tokyo (JP)

( * ) Notice: Subject to any disclaimer, the term of this patent is extended or adjusted under 35 U.S.C. 154(b) by 108 days.

(21) Appl. No.: 12/738,678

(22) PCT Filed: Sep. 29, 2008

(86) PCT No.: PCT/JP2008/067665
§ 371 (c)(1),
(2), (4) Date: Apr. 19, 2010

(87) PCT Pub. No.: WO2009/054233
PCT Pub. Date: Apr. 30, 2009

(65) Prior Publication Data
US 2010/0294944 A1 Nov. 25, 2010

(30) Foreign Application Priority Data
Oct. 26, 2007 (WO) .................. PCT/JP2007/070936

(51) Int. Cl.
*H01L 25/00* (2006.01)
*H01L 27/00* (2006.01)
(52) U.S. Cl. ................. 250/370.1; 250/370.09
(58) Field of Classification Search ............... 250/370.1, 250/370.09, 363.03
See application file for complete search history.

(56) References Cited

U.S. PATENT DOCUMENTS

| | | | | | |
|---|---|---|---|---|---|
| 4,314,337 | A | * | 2/1982 | Kowalski | 378/4 |
| 4,559,597 | A | * | 12/1985 | Mullani | 600/407 |
| 4,694,316 | A | * | 9/1987 | Chabbal | 257/231 |
| 4,878,186 | A | * | 10/1989 | Gagnon | 702/194 |
| 4,879,464 | A | * | 11/1989 | Iinuma | 250/361 R |
| 4,893,018 | A | * | 1/1990 | Saitou | 250/370.1 |
| 5,131,021 | A | * | 7/1992 | Gard et al. | 378/19 |
| 7,110,498 | B2 | * | 9/2006 | Yamada | 378/98.8 |
| 7,391,027 | B2 | * | 6/2008 | Kitamura | 250/363.03 |
| 7,718,971 | B2 | * | 5/2010 | Tanaka | 250/363.07 |
| 2003/0116713 | A1 | * | 6/2003 | Cooke et al. | 250/369 |
| 2006/0000979 | A1 | * | 1/2006 | Xie et al. | 250/363.03 |
| 2007/0112596 | A1 | * | 5/2007 | Exelmans | 705/2 |
| 2008/0240341 | A1 | * | 10/2008 | Possin et al. | 378/19 |
| 2009/0114829 | A1 | * | 5/2009 | He et al. | 250/370.01 |
| 2010/0116999 | A1 | * | 5/2010 | Tumer et al. | 250/370.13 |
| 2010/0329425 | A1 | * | 12/2010 | Guo et al. | 378/91 |

FOREIGN PATENT DOCUMENTS

JP 7-311270 A 11/1995
JP 8-68863 A 3/1996

* cited by examiner

*Primary Examiner* — Christine Sung
(74) *Attorney, Agent, or Firm* — Cheng Law Group, PLLC

(57) ABSTRACT

A radiation detector of this invention includes a pulse width modulation circuit for binarizing an analog electrical pulse outputted from a detector cell with a predetermined threshold, and modulating it into a digital electrical pulse, and a data superposer for outputting an incident position pulse train by superposing incident position pulses and concerning the position of the detector cell on which the radiation has fallen, and the digital electrical pulse detected by the radiation. Thus, position information which has conventionally been added after output of digital electrical pulse can be added into the digital electrical pulse. Therefore, compared with the conventional technique of adding position information after digital electrical pulse and transmitting the position information, the position of the radiation incident on the detector cell can be detected in a short time.

15 Claims, 11 Drawing Sheets

RADIATION DETECTOR

TECHNICAL FIELD

This invention relates to a radiation detector having a plurality of detector cells for converting incident radiation into electrical pulses to detect the radiation, and more particularly relates to a technique for detecting positions of the detector cells on which the radiation falls.

BACKGROUND ART

A conventional technique will be described by taking, for example, a detector for PET (Positron Emission Tomography) which is a radiation detector. As a detector for PET, a radiation detector has been proposed, which has detector cells of small area arranged at pitches of about 1 mm for the purpose of improvement in spatial resolution. For securing an effective field of view size by using such detector cells arranged at small pitches, it is necessary to arrange the detector cells two-dimensionally, which requires a huge number of channels.

Generally, there are two types of methods for identifying which detector cells of the numerous detector cells have received radiation. The first is a method which reads in parallel all signals that can be acquired from the channels (see Patent Document 1, for example). The second is a method called Anger method which is realized through centroid calculations by analog circuitry (see Patent Document 2, for example). Conventionally, since it is necessary to lower the cost of the circuit portion in a commercial machine, Anger method is used which uses a PMT (photomultiplier tube).
[Patent Document 1]
Unexamined Patent Publication H8-68863 (pages 2-3, FIG. 1)
[Patent Document 2]
Unexamined Patent Publication H7-311270 (pages 2-3, FIGS. 2 and 4)

DISCLOSURE OF THE INVENTION

Problem to be Solved by the Invention

However, the conventional techniques have the following drawback. Since signal wiring increases to involve many stretches of the signal wiring for attaining a spatial resolution not exceeding 1 mm, signals tend to be affected by noise. It is difficult to secure a predetermined spatial resolution or time resolution.

This invention has been made having regard to the state of the art noted above, and its object is to provide a radiation detector which can detect positions of radiation incident on detector cells in a short time even when detecting the radiation with numerous detector cells.

Means for Solving the Problem

To fulfill the above object, this invention provides the following construction.

A radiation detector of this invention is a radiation detector having a plurality of detector cells which convert light emission by incidence of radiation into analog electrical pulses to detect the radiation, comprising a pulse width modulating device for binarizing the analog electrical pulses with a predetermined threshold, and outputting digital electrical pulses; and a position information adding device for outputting incident position pulse trains formed by adding information on positions of the detector cells on which the radiation falls to the electrical pulses.

Thus, the pulse width modulating device binarizes an analog electrical pulse outputted from each detector cell with a predetermined threshold, and modulates it into a digital electrical pulse. The position information adding device outputs an incident position pulse train by superposing information on the position of the detector cell and the digital electrical pulse detected upon incidence of the radiation. Thus, position information which has conventionally been added after an output of a pulse can be added into the digital electrical pulse. Therefore, compared with the conventional technique of adding position information after the electrical pulse and transmitting the position information, the position of the radiation incident on each detector cell can be detected in a short time.

According to this invention noted above, it is preferred that the position information adding device is arranged to output the incident position pulse trains synchronously with timing of the analog electrical pulses being above and timing of the analog electrical pulses being below the predetermined threshold. Thus, the position information adding device outputs the incident position pulse trains synchronously with the timing of analog electrical pulses being above, and the timing of their being below the predetermined threshold. Consequently, the positions of the radiation incident on the detector cells can be detected in a short time based on variations in the size of the analog electrical pulses.

According to this invention noted above, it is preferred that widths of the pulses forming the incident position pulse trains are X-channel numbers and Y-channel numbers of the detector cells arranged in two dimensions consisting of X-direction and Y-direction. Thus, X-channel numbers and Y-channel numbers of the detector cells on which the radiation has fallen can be detected accurately. Consequently, the positions in X-direction and Y-direction of the detector cells on which the radiation has fallen can be detected in a short time.

According to this invention noted above, it is preferred that widths of the pulses forming the incident position pulse trains are X-channel numbers, Y-channel numbers and Z-channel numbers of the detector cells arranged in three dimensions consisting of X-direction, Y-direction and Z-direction. Thus, X-channel numbers, Y-channel numbers and Z-channel numbers of the detector cells on which the radiation has fallen can be detected accurately. Consequently, the positions in X-direction, Y-direction and Z-channel numbers of the detector cells on which the radiation has fallen can be detected in a short time.

According to this invention noted above, it is preferred that pitches of the pulses forming the incident position pulse trains are proportional to crest values of the analog electrical pulses. Thus, pitches of the pulses forming the incident position pulse trains are proportional to crest values of the analog electrical pulses. Consequently, the crest values of the radiation incident on the detector cells can be detected in a short time.

According to this invention noted above, it is preferred that the detector comprises a pulse train compressing device for compressing the incident position pulse trains and outputting compressed pulse trains, and a pulse train decompressing device for decompressing the compressed pulse trains back to the incident position pulse trains. Thus, the pulse train compressing device compresses the incident position pulse train outputted from each detector cell, and outputs a compressed pulse train, and the pulse train decompressing device restores the incident position pulse train to be transmitted. Consequently, the incident position pulse trains can be transmitted through transmission lines smaller in number than the detector cells.

According to this invention noted above, it is preferred that the pulse train compressing device is provided for each group formed of a plurality of the detector cells, the compressed pulse train being outputted for each group, the radiation detector comprising a group position information adding device for outputting, for each group, a group pulse train formed by adding information on a position of the group to the compressed pulse train outputted for each group. Thus, the group position information adding device outputs the group pulse train formed by adding information on the position of the group to the compressed pulse train, also in the radiation detector having the detector cells put into groups. Consequently, it is possible to detect, with a reduced number of transmission lines, which group has outputted the group pulse train outputted from each group.

According to this invention noted above, it is preferred that the detector comprises a group compression device for compressing the group pulse train and outputting a group compression pulse train, and a group decompression device for decompressing the group compression pulse train to the group pulse train, and decompressing the group pulse train to the compressed pulse train. Thus, the group compression device compresses the group pulse train outputted from the group position information adding device, to output a group compression pulse train, and the group decompression device decompressing the group compression pulse train back to the group pulse train. Consequently, also when the compressed pulse train is outputted from the pulse train compressing device provided for each group, the position of the group outputting the compressed pulse train can be detected in a short time.

According to this invention noted above, it is preferred that the position information adding device includes a delay circuit (B) for outputting delay signals (A) outputted as corresponding to the information on positions of the detector cells, and a logic circuit (C) for outputting the incident position pulse trains when the electrical pulses and the delay signals (A) are inputted. Thus, the position information adding device includes a delay circuit (B) and a logic circuit (C), the delay circuit (B) outputting the delay signals (A) corresponding to the information on positions of the detector cells, and the logic circuit (C) outputting the incident position pulse trains when the electrical pulses and the delay signals (A) are inputted. Consequently, the position information adding device can output the incident position pulse trains corresponding to the information on the position of the detector cells on which the radiation has fallen. Therefore, the positions of the radiation incident on the detector cells can be detected in a short time.

According to this invention noted above, it is preferred that the logic circuit (C) is a logic circuit for outputting the incident position pulse trains, such that one pulse forming each incident position pulse trains falls synchronously with rises of the delay signals (A), and a different pulse forming each incident position pulse train falls synchronously with the falls of the delay signals (A), the one pulse and the different pulse being arranged in a row. Thus, the incident position pulse train has, superposed thereon, time information from the rise of the digital electrical pulse to the rises of the delay signals (A), and time information from the fall of the digital electrical pulse to the falls of the delay signals (A). Consequently, the digital electrical pulses can detect the positions of the radiation incident on the detector cells in a short time based on such time information.

According to this invention noted above, it is preferred that the position information adding device includes a delay circuit (E) formed of a capacitor having a capacity corresponding to the information on the positions of the detector cells, and a resistor having a resistance value, for outputting a delay signal (D), a comparator for outputting the pulses forming the incident position pulse trains when, upon comparison with the predetermined threshold, the delay signal (D) is above the predetermined threshold, and a logic circuit (F) for outputting the incident position pulse trains with an arrangement in a row of the pulses outputted from the comparator. Thus, the capacitor and resistor forming the delay circuit (E) change the output of the electrical pulses, the comparator binarizes the electrical pulses outputted through the capacitor and resistor and exceeding the predetermined threshold, and outputs the pulses forming the incident position pulse trains, and the logic circuit (F) bundles the pulses outputted from the comparator. Consequently, the position information adding device can output the incident position pulse trains corresponding to the information on the positions of the detector cells on which the radiation is incident. Therefore, the positions of the radiation incident on the detector cells can be detected in a short time.

According to this invention noted above, it is preferred that the group position information adding device includes a delay circuit (H) for outputting a delay signal (G) outputted as corresponding to the information on the position of the group, and a logic circuit (I) for outputting the group pulse train when the compressed pulse train and the delay signal (G) are inputted. Thus, the group position information adding device includes the delay circuit (H) and logic circuit (I), the delay circuit (H) outputs the delay signal (G) corresponding to the information on the position of the group, and the logic circuit (I) outputs the group pulse train when the compressed pulse train and the delay signal (G) are inputted. Consequently, the group position information adding device can output the group pulse train corresponding to the information on the position of the group outputting the compressed pulse train. Therefore, the position of the group outputting the compressed pulse train can be detected in a short time.

According to this invention noted above, it is preferred that the logic circuit (I) is a logic circuit for outputting the group pulse train, such that one pulse forming the group pulse train falls synchronously with a rise of the delay signal (G), and a different pulse forming the group pulse train falls synchronously with a fall of the delay signal (G), the one pulse and the different pulse being arranged in a row. Thus, the position of the group outputting the compressed pulse train can be detected in a short time.

According to this invention noted above, it is preferred that the group position information adding device includes a delay circuit (K) formed of a capacitor having a capacity corresponding to the information on positions of the detector cells, and a resistor having a resistance value, for outputting a delay signal (J), a comparator (L) for outputting the pulses forming the group pulse train when, upon comparison with the predetermined threshold, the delay signal (J) is above the predetermined threshold, and a logic circuit (M) for outputting the group pulse train with an arrangement in a row of the pulses outputted from the comparator. Thus, the capacitor and resistor forming the delay circuit (J) change the output of the compressed pulse train, the comparator (L) binarizes the compressed pulse train outputted through the capacitor and resistor and exceeding the predetermined threshold, and outputs the pulses forming the group pulse train, and the logic circuit (M) bundles the group pulse train outputted from the comparator (L). Consequently, the group position information adding device can output the group pulse train corresponding to the information on the position of the group outputting the compressed pulse train. Therefore, the position of the group outputting the compressed pulse train can be detected in a short time.

According to this invention noted above, it is preferred that the pulse width modulating device includes a plurality of comparators, the respective comparators being used for binarizing the analog electrical pulses with predetermined thresholds, and outputting digital electrical pulses. Thus, more accurate crest values and timing information can be obtained.

According to this invention noted above, it is preferred that the position information adding device is arranged to output the incident position pulse train using a multivalued logic technique involving different pulse widths and pulse amplitudes. Thus, by carrying out an analog addition of the pulses, an incident position pulse train with different pulse widths and pulse amplitudes can be outputted.

Effects of the Invention

With the radiation detector according to this invention, the pulse width modulating device binarizes an analog electrical pulse outputted from each detector cell with a predetermined threshold, and modulates it into a digital electrical pulse. The position information adding device outputs an incident position pulse train by superposing information on the position of the detector cell and the digital electrical pulse detected upon incidence of the radiation. Thus, position information which has conventionally been added after an output of a pulse can be added into the digital electrical pulse. Therefore, compared with the conventional technique of adding position information after the electrical pulse and transmitting the position information, the position of the radiation incident on each detector cell can be detected in a short time.

DESCRIPTION OF REFERENCES

1 . . . radiation detector
7 . . . detector cells
11 . . . pulse width modulation circuit
13 . . . data superposer
17 . . . compressor
P . . . analog electric pulse
Pp . . . digital electric pulse
Px . . . incident position pulse showing X-channel number of detector cell
Py . . . incident position pulse showing Y-channel number of detector cell
Pw . . . pulse width of Pp
Pw1 . . . pulse width of Px
Pw2 . . . pulse width of Py
Pw3 . . . rise time lag between Px and Py
Pt . . . incident position pulse train
Pp1 . . . digital electric pulse
Pp2 . . . digital electric pulse
Pp3 . . . digital electric pulse
Pp4 . . . digital electric pulse
Pw4 . . . pulse width of Pp1
Pw5 . . . pulse width of Pp2
Pw6 . . . pulse width of Pp3
Pw7 . . . pulse width of Pp4
Pw8 . . . pulse width of Px
Pw9 . . . pulse width of Py
Pt2 . . . incident position pulse train having Pp3 and Pp4
Pt3 . . . incident position pulse train (of multivalued logic)

BEST MODE FOR CARRYING OUT THE INVENTION

The object of accurately detecting positions of radiation incident on detector cells in a short time has been fulfilled by outputting incident position pulse trains with a superposition of information on positions of the detector cells on which radiation is incident and electrical pulses detected as a result of the incidence of the radiation.

Embodiment 1

Figure 1:
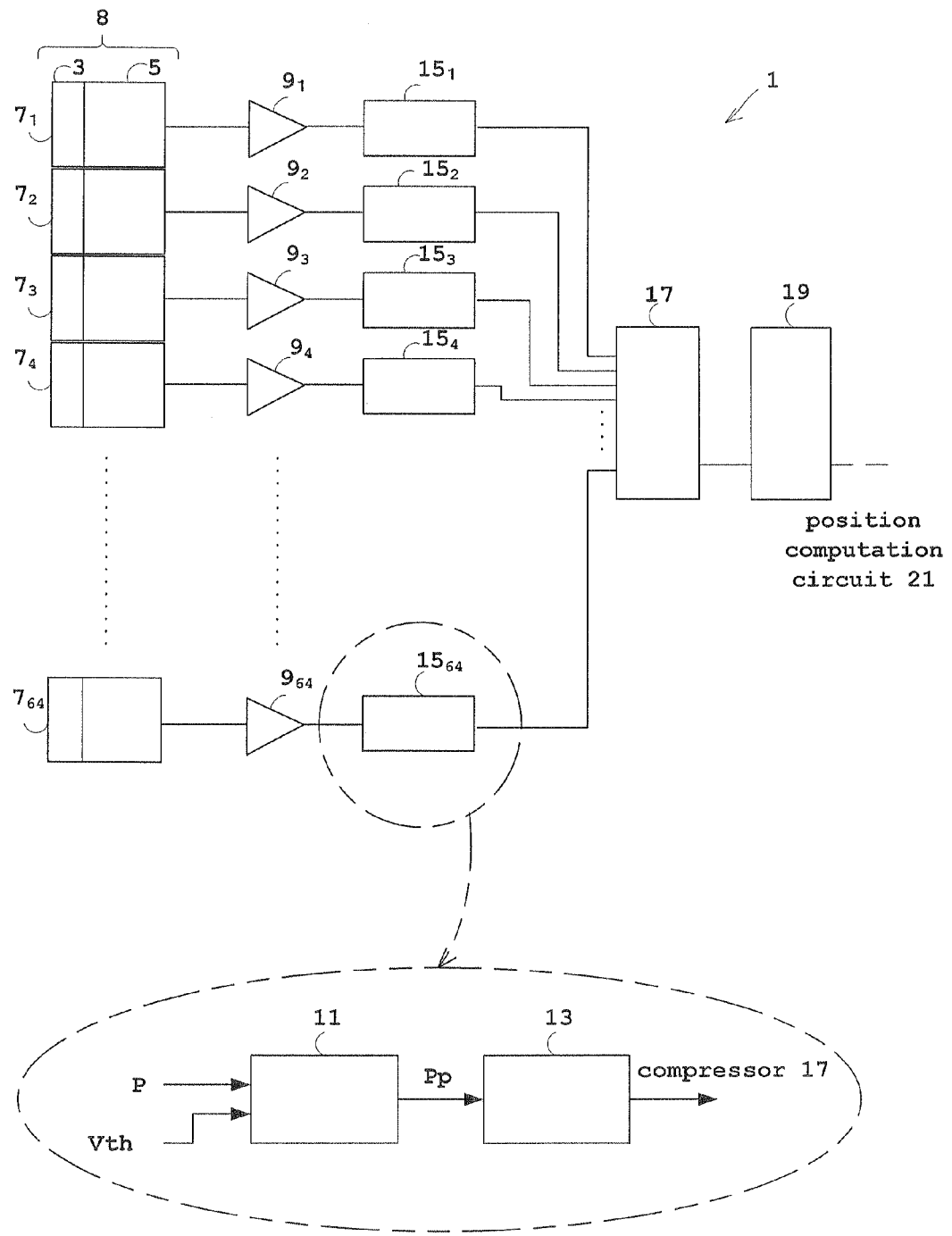
FIG. 1 is a block diagram showing an overall construction of a radiation detector according to Embodiment 1.
Figure 2:
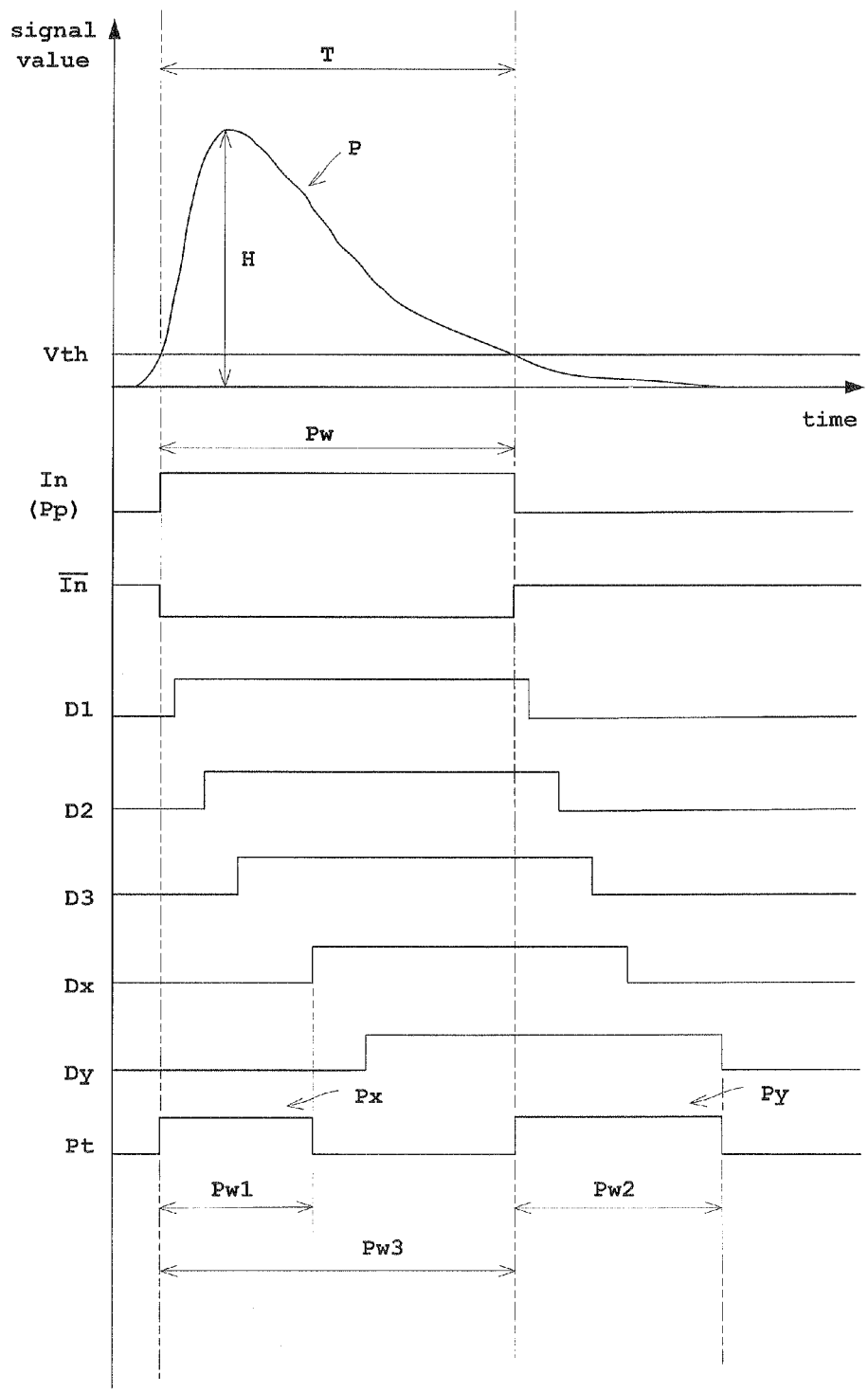
FIG. 2 is a timing chart showing signal additions in the radiation detector according to Embodiment 1.
Figure 3:
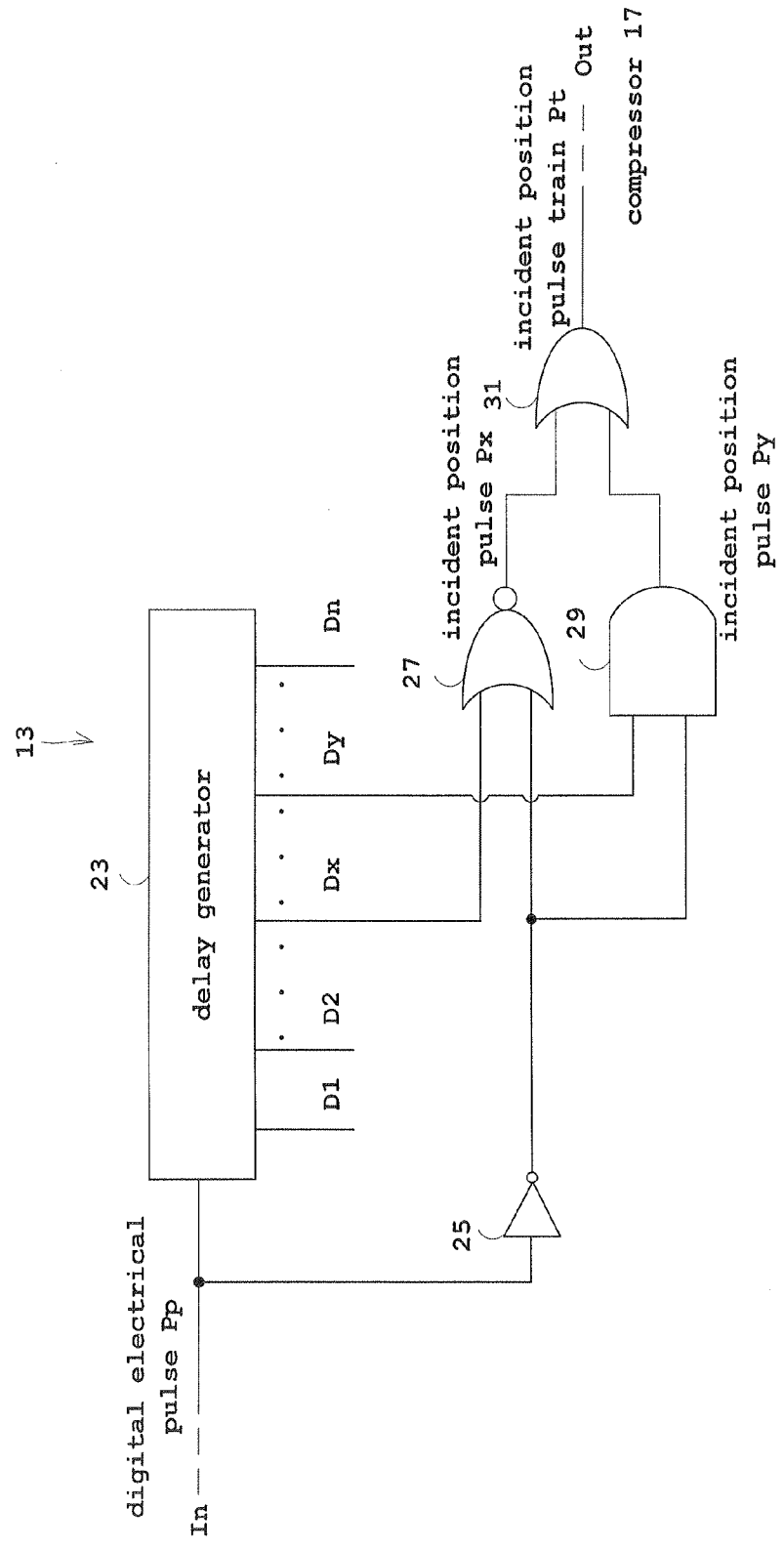
FIG. 3 is a circuit diagram of a data superposer provided for the radiation detector according to Embodiment 1.
Figure 4:
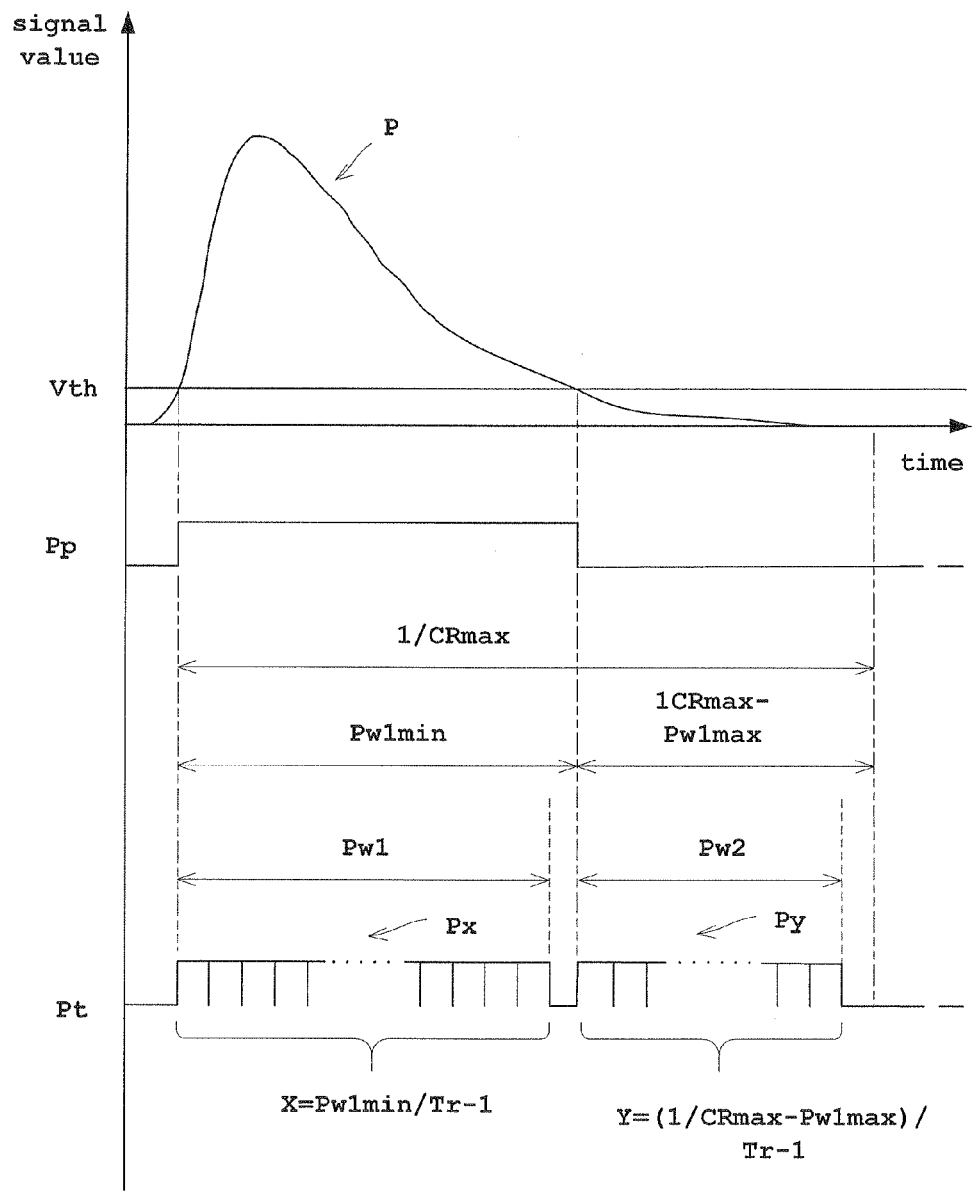
FIG. 4 is a schematic view showing an amount of information which can be expressed by the data superposer provided for the radiation detector according to Embodiment 1.
Figure 5:
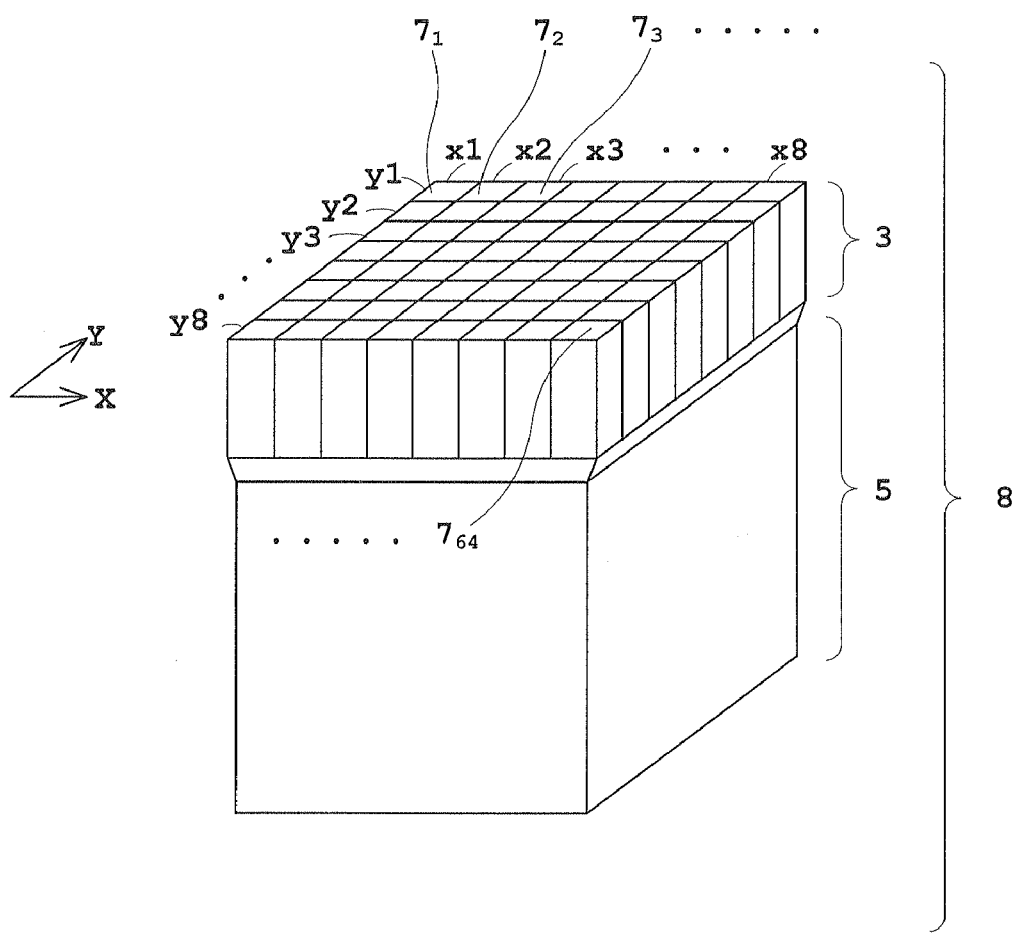
FIG. 5 is a schematic view of a detector cell group provided for the radiation detector according to Embodiment 1.

Embodiment 1 of this invention will be described hereinafter with reference to the drawings. FIG. 1 is a block diagram showing an overall construction of a radiation detector according to Embodiment 1. FIG. 2 is a timing chart for generating an incident position pulse train by adding delay signals to electrical pulses detected by the radiation detector. FIG. 3 is a circuit diagram of a data superposer for generating the incident position pulse train. FIG. 4 is a schematic view showing the number of channels which can be expressed by the data superposer. FIG. 5 is a schematic view of a detector cell group having a plurality of detector cells 7 arranged two-dimensionally in X-direction and Y-direction.

As shown in FIG. 1, a radiation detector 1 according to Embodiment 1 includes detector cells $7_1$ through $7_{64}$ (which may be collectively called detector cell(s) 7 hereinafter) having scintillators 3 and photomultiplier tubes 5, preamplifiers $9_1$ through $9_{64}$ (which may be collectively called preamplifier(s) 9 hereinafter) for amplifying analog electrical pulses P detected by the detector cells 7, metadata adders $15_1$ through $15_{64}$ (which may be collectively called metadata adder(s) 15 hereinafter) having pulse width modulation circuits 11 and data superposers 13, and a compressor 17 for compressing incident position pulse trains Pt outputted from the metadata adders 15. Compressed pulse trains outputted from the compressor 17 are decompressed to the original incident position pulse trains Pt by a decompressor 19. The incident position pulse trains Pt are outputted to a position computation circuit 21, and from the incident position pulse trains Pt the position computation circuit 21 calculates positions where radiation falls on the detector cells.

The radiation detector 1 is a radiation detector or semiconductor detector having a combination of a scintillator 3, a photomultiplier tube (PMT) 5 and light receiving elements such as APD (Avalache Photo Diode) or SiPM (Silicon PhotoMultiplier).

As shown in FIG. 5, the detector cells 7 are arranged two-dimensionally in X-direction and Y-direction to form a detector cell group 8. Eight detector cells 7 are arranged in X-direction of the detector cell group 8, while eight detector cells 7 are arranged in Y-direction. That is, the detector cells 7 have channel numbers x1 through x8 in X-direction, and channel numbers y1 through y8 in Y-direction. And the respective detector cells 7 have channel information such as detector cell $7_1$ (x=1, y=1), detector cell $7_2$ (x=2, y=1) and so on. The detector cell group 8 includes the detector cells 7 which are detector cells $7_1$ through $7_{64}$.

A pulse width modulation circuit 11 will be described with reference to FIGS. 1 and 2. As shown in FIG. 1, the pulse width modulation circuit 11 modulates an analog electrical pulse P inputted from the preamplifier 9 to a digital electrical pulse Pp for output to the data superposer 13. The pulse width modulation circuit 11 compares the analog electrical pulse P inputted from the detector cell 7 with a threshold voltage Vth, outputs High when the analog electrical pulse P is above the threshold voltage Vth, and outputs Low when the analog electrical pulse P is below the threshold voltage Vth. Output Pp of the pulse width modulation circuit 11 corresponds to In in FIG. 2. At this time, as shown in FIG. 2, the longer is the time T when the voltage value of the analog electrical pulse P is above the threshold voltage Vth, the longer becomes the width Pw of output High of the digital electrical pulse Pp (In shown in FIG. 2) outputted from the pulse width modulation circuit 11. Conversely, the shorter is the time T when the voltage value of the analog electrical pulse P is above the threshold voltage Vth, the shorter becomes the width Pw of output High of the digital electrical pulse Pp outputted from the pulse width modulation circuit 11. The greater is the signal strength (voltage value) of the analog electrical pulse P, the longer becomes the width Pw. The smaller is the signal strength (voltage value) of the analog electrical pulse P, the shorter becomes the width Pw. That is, the pulse width modulation circuit 11 encodes the signal strength of the analog electrical pulse P into the pulse width Pw. The pulse width modulation circuit 11 corresponds to the pulse width modulating device in this invention.

Circuits provided for the data superposer 13 will be described with reference to FIG. 3. The pulse width modulation circuit 11 outputs the digital electrical pulse Pp to a delay generator 23 and a NOT circuit 25. The NOT circuit 25 outputs the digital electrical pulse Pp to a NOR circuit 27 and an AND circuit 29. On the other hand, the delay generator 23 outputs to the NOR circuit 27 a delay signal Dx corresponding to the X-channel number of one of the detector cells $7_1$ through $7_{64}$ outputting the analog electrical pulse P, and outputs to the AND circuit 29 a delay signal Dy corresponding to the Y-channel number of the one of the detector cells $7_1$ through $7_{64}$ outputting the analog electrical pulse P. The delay generator 23 is a shift register circuit using a D flip-flop, for example. The analog electrical pulse P here refers to the pulse before the digital electrical pulse Pp is binarized. The NOR circuit 27 outputs an incident position pulse Px corresponding to the X-channel number to an OR circuit 31. The AND circuit 29 outputs an incident position pulse Py corresponding to the Y-channel number to the OR circuit 31. Based on the incident position pulses Px and Py, the OR circuit 31 outputs an incident position pulse train Pt to the compressor 17. The data superposer 13 corresponds to the position information adding device in this invention. The delay signals Dx and Dy correspond to the delay signals (A) in this invention. The delay generator 23 corresponds to the delay circuit (B) in this invention. The NOT circuit 25, NOR circuit 27, AND circuit 29 and OR circuit 31 correspond to the logic circuit (C) in this invention.

The timing of adding position information to the digital electrical pulse will be described with reference to FIG. 2. FIG. 2 is a timing chart in which the vertical axis represents signal value and the horizontal axis time. In is the digital electrical pulse Pp outputted from the pulse width modulation circuit 11. In bar is a signal outputted from the NOT circuit 25. D1, D2, D3, Dx and Dy are delay signals outputted from the delay generator 23. Out is the incident position pulse train Pt consisting of the incident position pulses Px and Py. Pw1 shows a pulse width when the incident position pulse Px is High. Pw2 shows a pulse width when the incident position pulse Py is High. Pw3 shows a time lag from the rise of the incident position pulse Px to the rise of the incident position pulse Py. The delay signals D1, D2 and D3 correspond to the delay signals (A) in this invention.

The incident position pulse Px rises synchronously with the rise of In (Pp), and falls synchronously with the rise of the delay signal Dx. The incident position pulse Py rises synchronously with the fall of In (Pp), and falls synchronously with the fall of the delay signal Dy.

Thus, the pulse width Pw1 of the incident position pulse Px and the pulse width Pw2 of the incident position pulse Py constituting the incident position pulse train Pt means the X-channel number and Y-channel number of the detector cell 7 outputting the analog electrical pulse P. Pw3 showing the rise time lag between the incident position pulse Px and incident position pulse Py constituting the incident position pulse train Pt varies with the size of the analog electrical pulse P, and thus means a crest value H of the analog electrical pulse P. The rise of the incident position pulse train Pt or incident position pulse Px means the timing of radiation incident on the detector cell 7.

The number of channels of detector cells 7 that can be superposed on the incident position pulse trains Pt will be described with reference to FIG. 4. The number of channels here means the number of detector cells 7 indicated as detector cells $7_1$ through $7_{64}$ in FIG. 5.

The number of channels of the detector cells 7 superposable on the incident position pulse trains Pt is the product of the number of channels in X-direction and the number of channels in Y-direction that can be expressed by the incident position pulses Px and Py. The number of channels in X-direction of the detector cells 7 that can be expressed by the incident position pulse Px is a number obtained by dividing a minimum crest value of radiation which needs to be measured (minimum of pulse width Pw1), i.e. the rise time lag (hereinafter called pulse pitch) Pw3 between Px and Py, by read time resolution Tr of the decompressor 19. When the entire pulse width Pw1 is used for channel information, a boundary between pulse width Pw1 and pulse width Pw2 cannot be distinguished, and therefore a separation of at least 1Tr is desirable. An equation expressing the number of channels in X-direction as X is X=Pw3÷Tr−1. Similarly, an equation expressing the number of channels in Y-direction as Y is Y=Pw2÷Tr−1. The product of X and Y obtained is the number of channels of the detector cells that can be expressed by the pulse widths Pw1 and Pw2.

To determine this in detail, as shown in FIG. 4, X and Y are dependent on minimum pulse width Pw1min occurring with each channel, maximum count rate CRmax required, and time resolution Tr of a subsequent reading method, hence $X = Pw1min/Tr - 1$ and $Y = (1/CRmax - Pw1max)/Tr - 1$. Pw1max is a maximum value of the pulse width Pw1 of the incident position pulse Px. This is the same value as pulse pitch Pw3. CRmax is a maximum value of a count rate required of the radiation detector. 1/CRmax is a minimum time until a next incidence of the radiation. Tr is a read time resolution of the decompressor 19.

Where, for example, the time resolution of the reading device is 10 ns, the pulse width of pulse Pp1 produced by each channel at a time of event incidence is 100 through 200 ns, and the maximum count rate required is 4 Mcps, $X = 100 \text{ ns} \div 10 \text{ ns} - 1 = 9$, and Y is $(250 \text{ ns} - 200 \text{ ns})/10 \text{ ns} - 1 = 4$. The number of information that can be expressed with this condition is $X \times Y = 9 \times 4 = 36$. Although this is an insufficient number for a large-scale system, the number of information that can be expressed can be increased greatly by improving the time resolution Tr. For example, $X \times Y = 171$ when Tr is 5 ns, and $X \times Y = 1176$ when Tr is 2 ns. Thus, when the time resolution of the reading device is about 2 ns, the number of channels exceeding 1000 ch can be expressed. Or the number of channels that can be expressed can be increased also by further adding pulses as a pulse train to the subsequent stage.

The compressor 17 compresses the incident position pulse train Pt outputted from each detector cell 7, and outputs a compressed pulse train Pc to the decompressor 19. The decompressor 19 decompresses the compressed pulse train Pc back to the incident position pulse train Pt. The compressor 17 corresponds to the pulse train compressing device in this invention. The decompressor 19 corresponds to the pulse train decompressing device in this invention.

According to the radiation detector 1 described in Embodiment 1, the pulse width modulation circuit 11 binarizes an analog electrical pulse P outputted from each detector cell 7 with a predetermined threshold Vth, and modulates it into a digital electrical pulse Pp. The data superposer 13 outputs an incident position pulse train Pt by superposing incident position pulses Px and Py concerning the position of the detector cell 7 on which radiation has fallen, and the digital electrical pulse Pp detected due to the radiation. Thus, position information which has conventionally been added after an output of the digital electrical pulse Pp can be added into the digital electrical pulse Pp. Therefore, compared with the conventional technique of adding position information after the digital electrical pulse Pp and transmitting the position information, the position of the radiation incident on the detector cell 7 can be detected in a short time.

According to the radiation detector 1 described in Embodiment 1, since the data superposer 13 outputs incident position pulses Px and Py forming the incident position pulse train Pt synchronously with the timing of analog electrical pulse P being above, and the timing of its being below the predetermined threshold Vth, the incident position pulse train Pt can be outputted according to variations in the size of the analog electrical pulse Pp. Therefore, based on variations in the pulse pitch of incident position pulse train Pt, the crest value of the radiation incident on the detector cell 7 can be detected in a short time.

According to the radiation detector 1 described in Embodiment 1, pulse width Pw1 at the time of incident position pulse Px forming the incident position pulse train Pt being High, and pulse width Pw2 at the time of incident position pulse Py being High, are X-channel numbers and Y-channel numbers of detector cells 7 arranged two-dimensionally in X-direction and Y-direction. Thus, X-channel numbers and Y-channel numbers of the detector cells 7 on which the radiation has fallen can be detected accurately. And since the data superposer 13 superposes incident position pulse Px with pulse width Pw1 and incident position pulse Py with pulse width Pw2 on the digital electrical pulse Pp and outputs the incident position pulse train Pt, the positions in X-direction and Y-direction of the detector cells 7 on which the radiation has fallen can be detected in a short time.

According to the radiation detector 1 described in Embodiment 1, the widths of the pulses forming the incident position pulse trains Pt are X-channel numbers, Y-channel numbers and Z-channel numbers of the detector cells 7 arranged in three-dimensions consisting of X-direction, Y-direction and Z-direction. Thus, X-channel numbers, Y-channel numbers and Z-channel numbers of the detector cells 7 on which the radiation has fallen can be detected accurately. Therefore, the positions in X-direction, Y-direction and Z-direction of the detector cells 7 on which the radiation has fallen can be detected in a short time.

According to the radiation detector 1 described in Embodiment 1, the rise time lag Pw3 between incident position pulse Px and incident position pulse Py forming the incident position pulse trains Pt is proportional to the crest value of analog electrical pulse P. Thus, based on the rise time lag Pw3 between incident position pulse Px and incident position pulse Py, the positions and crest values of the radiation incident on the detector cells 7 can be detected in a short time.

According to the radiation detector 1 described in Embodiment 1, the compressor 17 compresses the incident position pulse train Pt outputted from each detector cell 7, and outputs a compressed pulse train Pc, and the decompressor 19 can decompress the compressed pulse train Pc to the incident position pulse train Pt. Thus, thee positions of the radiation incident on the detector cells 7 can be detected in a short time. Compared with the conventional technique, the number of transmission lines from the compressor 17 to the decompressor 19 can be reduced.

According to the radiation detector 1 described in Embodiment 1, the data superposer 13 includes the delay generator 23, NOT circuit 25, NOR circuit 27 and AND circuit 29. When radiation is incident on a detector cell 7, the delay generator 23, based on the digital electrical pulse Pp detected by the detector cell 7, outputs to the NOR circuit 27 a delay signal Dx corresponding to the X-channel number peculiar to the detector cell 7, and outputs to the AND circuit 29 a delay signal Dy corresponding to the Y-channel number peculiar to the detector cell 7. The NOT circuit 25 inverts digital electrical pulse Pp detected by the detector cell 7, and outputs it to the NOR circuit 27 and AND circuit 29. When inverted digital electrical pulse Pp is inputted, the NOR circuit 27 will raise input position pulse Px and output it to the OR circuit 31. And when the delay signal Dx and inverted digital electrical pulse Pp are outputted to the NOR circuit 27, the NOR circuit 27 will bring down incident position pulse Px, and suspend the output. On the other hand, the AND circuit 29 does not output incident position pulse Py even when inverted digital electrical pulse Pp is inputted, but raises incident position pulse Py and outputs it to the OR circuit 31 when a rise of inverted digital electrical pulse Pp and delay signal Dy are inputted. The OR circuit 31, whenever incident position pulses Px and Py are inputted, outputs incident position pulses Px and Py as incident position pulse train Pt. Therefore, the incident position pulses Px and Py have pulse widths Pw1 and Pw2 peculiar to the detector cell 7, and since the incident position pulses Px and Py are superposed on the digital electrical pulse Pp and outputted as incident position pulse train Pt, the position of the radiation incident on the detector cell 7 can be detected in a short time.

Embodiment 2

Figure 6:
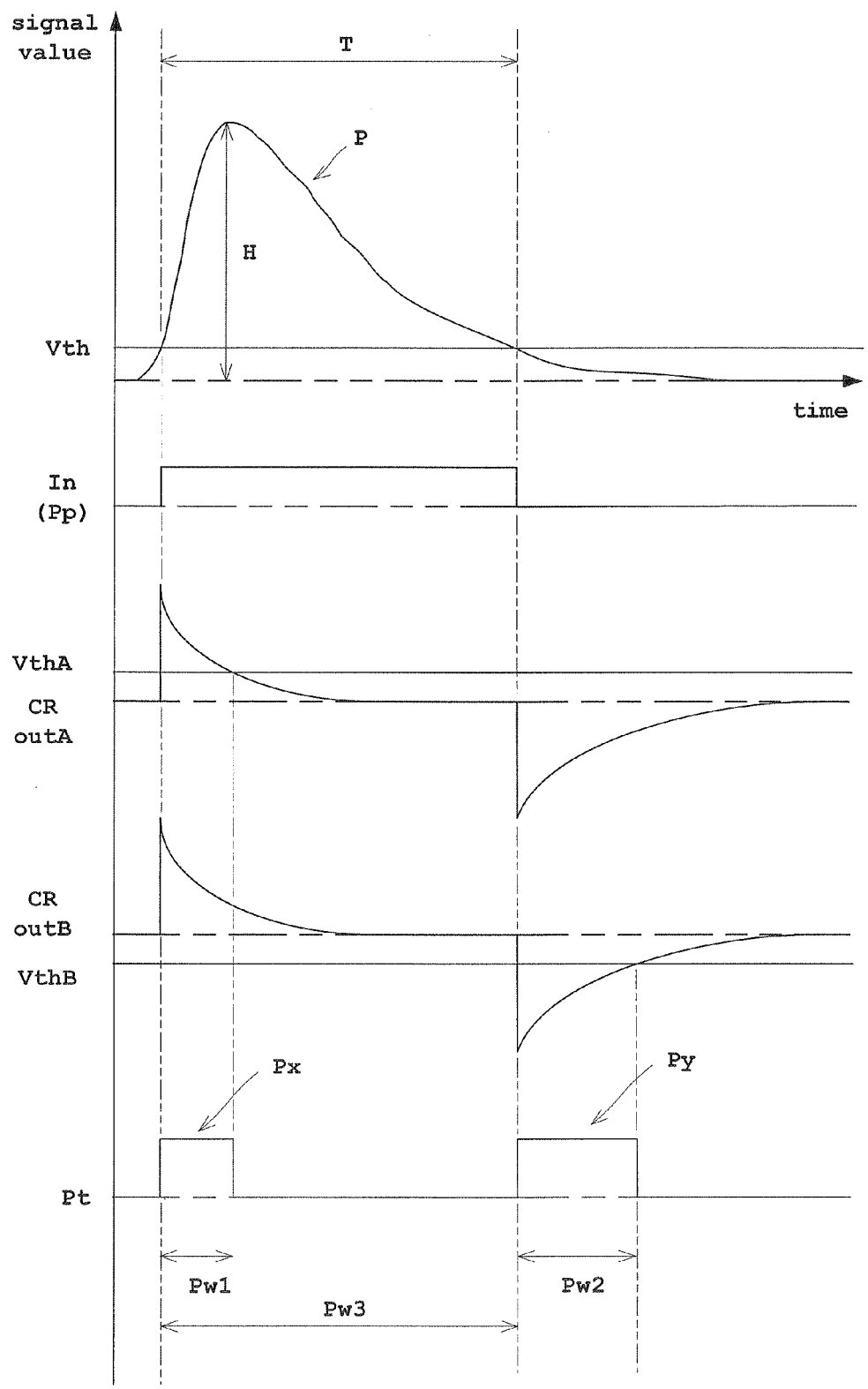
FIG. 6 is a timing chart showing signal additions in a radiation detector according to Embodiment 2.
Figure 7:
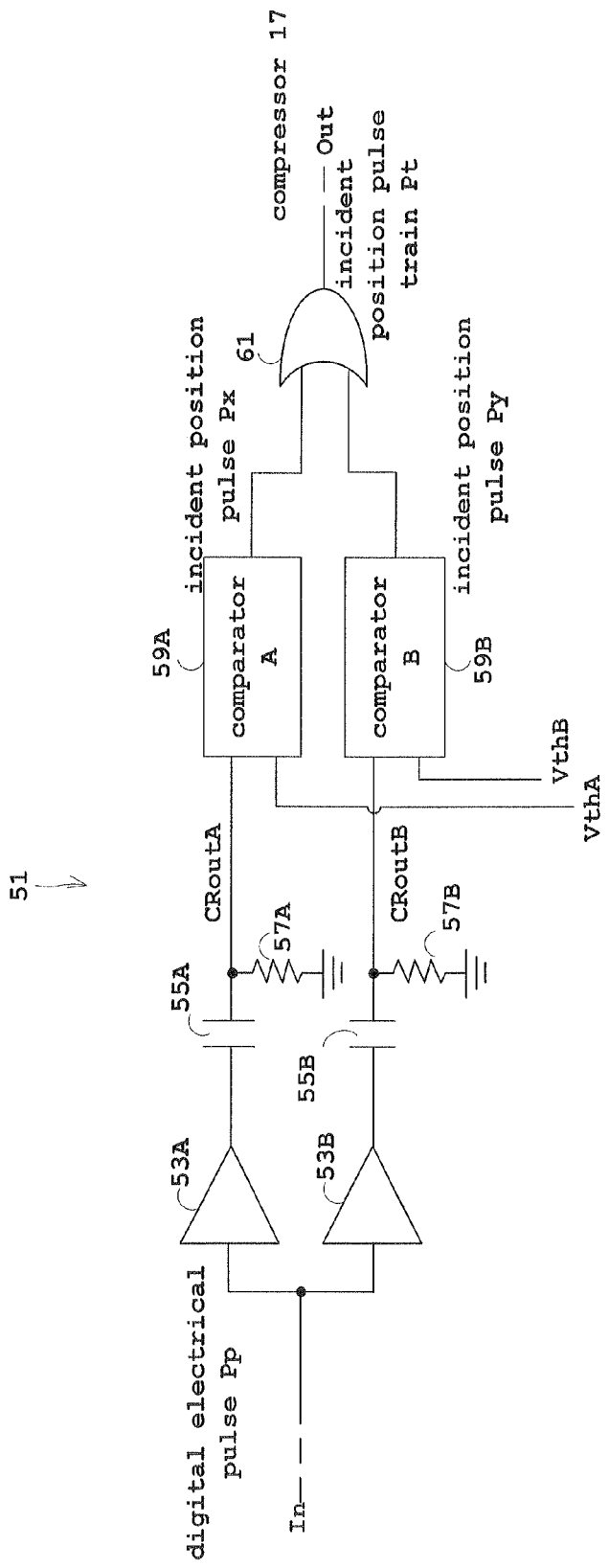
FIG. 7 is a circuit diagram of a CR data superposer provided for the radiation detector according to Embodiment 2.

Next, Embodiment 2 of this invention will be descrioed with reference to the drawings. FIG. 6 is a timing chart of generating an incident position pulse train from an electrical pulse detected by a radiation detector according to Embodiment 2. FIG. 7 is a circuit diagram of a CR type data superposer for generating the incident position pulse train.

An overall construction of the radiation detector according to Embodiment 2 is approximately the same as the overall construction of the radiation detector according to Embodiment 1, but is different in having a CR data superposer 51 instead of the data superposer 13 described in Embodiment 1.

The circuit diagram of the CR data superposer 51 will be described with reference to FIG. 7. The CR data superposer 51 is formed of CR circuits including buffer circuits 53A and 53B, capacitors 55A and 55B, resistors 57A and 57B, comparators 59A and 59B, and an OR circuit 61. The capacitors 55A and 55B and resistors 57A and 57B correspond to the delay circuit (E) in this invention. The OR circuit 61 corresponds to the logic circuit (F) in this invention.

Digital electrical pulse Pp is inputted from the pulse width modulation circuit 11 to the buffer circuit 53A. Next, the digital electrical pulse Pp is inputted from the buffer circuit 53A to the capacitor 55A. Next, the digital electrical pulse Pp is outputted from the capacitor 55A, while being discharged from the resistor 57A. This output is CRoutA. CRoutA is inputted to the comparator 59A. CRoutA is binarized by a threshold VthA, and is inputted from the comparator 59A to the OR circuit 61. This binarized output is incident position pulse Px. The incident position pulse Px is superposed with an incident position pulse Py similarly outputted from the comparator B, to form an incident position pulse train Pt. The incident position pulse train Pt is inputted from the OR circuit 61 to the compressor 17. CRoutA and CRoutB correspond to the delay signal (D) in this invention.

The capacitors 55A and 55B have the same capacity, and the capacity varies with every detector 7 from which digital electrical pulse Pp is outputted. A correspondence relationship between each detector cell 7 and the capacity of capacitors 55A and 55B is stored as a lookup table, for example, in a memory not shown. Capacitors 55A and 55B different in capacity for every detector cell 7 may be provided.

The resistors 57A and 57B also have a construction similar to the capacitors 55A and 55B. Each detector cell 7 and the resistance value of resistors 57A and 57B have a correspondence relationship.

The timing of the CR data superposer 51 generating the incident position pulse train Pt from the digital electrical pulse Pp detected by the radiation detector 1 will be described with reference to FIG. 6.

As in Embodiment 1, In is the digital electrical pulse Pp outputted from the pulse width modulation circuit 11. CRoutA is a voltage value outputted to the comparator 59A when the digital electrical pulse Pp is inputted to the CR circuit formed of the capacitor 55A and resistor 57A. VthA is a threshold voltage which binarizes CRoutA with a positive value. Px is an incident position pulse produced by binarizing the digital electrical pulse Pp. Px is outputted from the comparator 59A to the OR circuit 61.

CRoutB is a voltage value outputted to the comparafor 59B when the digital electrical pulse Pp is inputted to the CR circuit formed of the capacitor 55B and resistor 57B. VthB is a threshold voltage which binarizes CRoutB with a negative value. Py is an incident position pulse produced by binarizing the digital electrical pulse Pp. Py is outputted from the comparator 59B to the OR circuit 61.

Pulse widths Pw1 and Pw2 of the incident position pulses Px and Py vary for every detector cell 7. The pulse width Pw1 means the X-channel number of detector cell 7, and the pulse width Pw2 means the Y-channel number of detector cell 7. The rise time lag Pw3 between Px and Py also vary for every detector cell 7. The rise time lag Pw3 between Px and Py means a crest value H of the analog electrical pulse P detected by the detector cell 7. The rise of incident position pulse train Pt or incident position pulse Px means the timing of radiation incident on the detector cell 7.

Whenever the incident position pulses Px and Py are inputted, the OR circuit 61 outputs the incident position pulses Px and Py as incident position pulse train Pt.

According to the radiation detector 1 in Embodiment 2, when digital electrical pulse Pp is inputted from each detector cell 7 to the CR data superposer 51, the capacitor 55A stores an electric charge, part of the stored electric charge is discharged through the grounded resistor 57, and the remaining CRoutA is outputted to the comparator 57A. While CRoutA is above the threshold voltage VthA, the comparator 57A outputs incident position pulse Px to the OR circuit 61. On the other hand, the capacitor 55B and resistor 57B similarly output CRoutB to the comparator 57B. While CRoutB is below the threshold voltage VthB, the comparator 57B outputs incident position pulse Py to the OR circuit 61. Whenever the incident position pulses Px and Py are inputted, the OR circuit 61 outputs incident position pulse train Pt. Since the incident position pulses Px and Py have pulse widths Pw1 and Pw2 determined by the capacity of capacitors 55A and 55B and the resistance value of resistors 57A and 57B peculiar to each detector cell 7, and the incident position pulses Px and Py are outputted as incident position pulse train Pt, the position of the radiation incident on the detector cell 7 can be detected in a short time.

Embodiment 3

Figure 8:
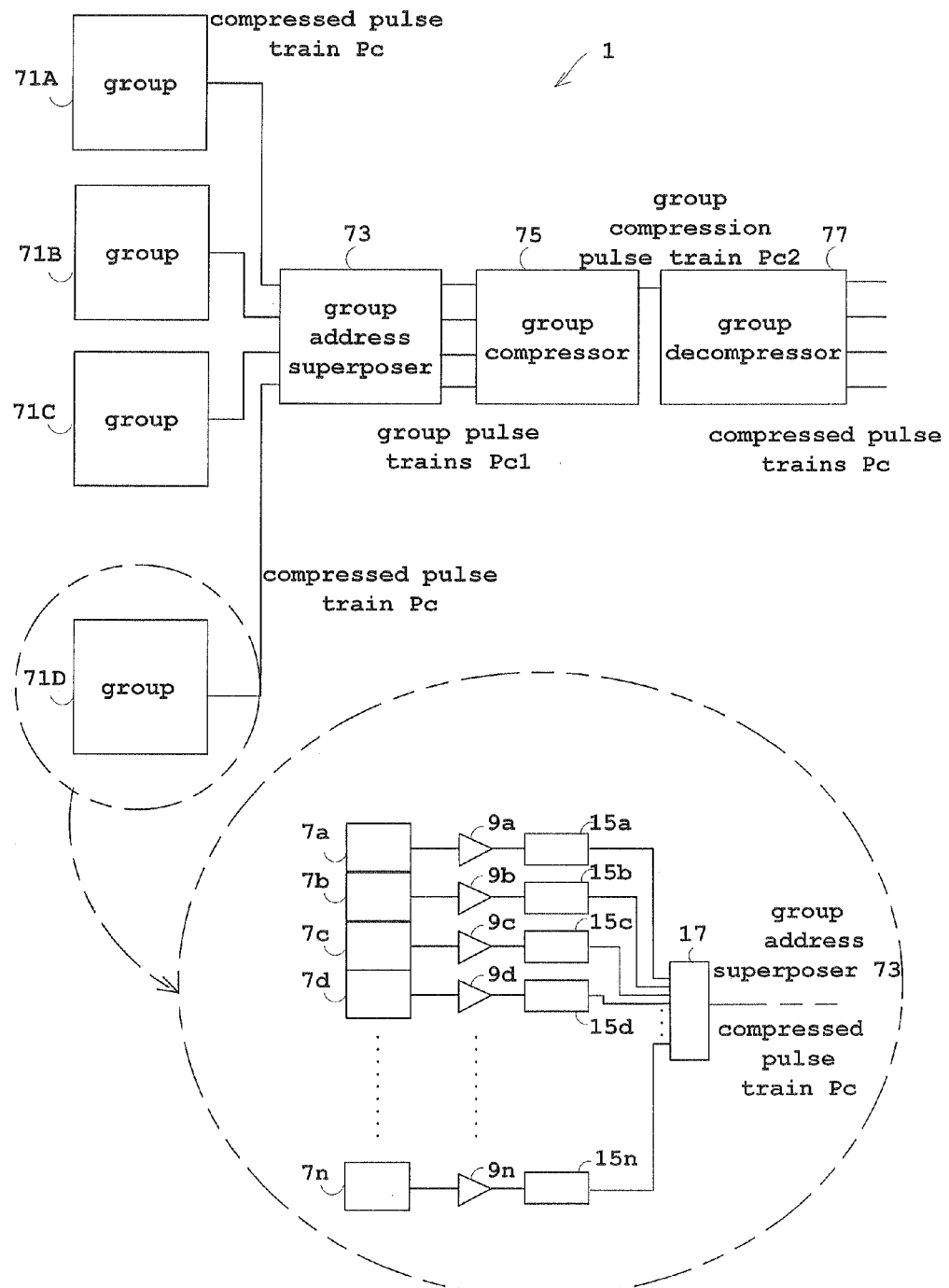
FIG. 8 is a block diagram showing an overall construction of a radiation detector according to Embodiment 3.
Figure 9:
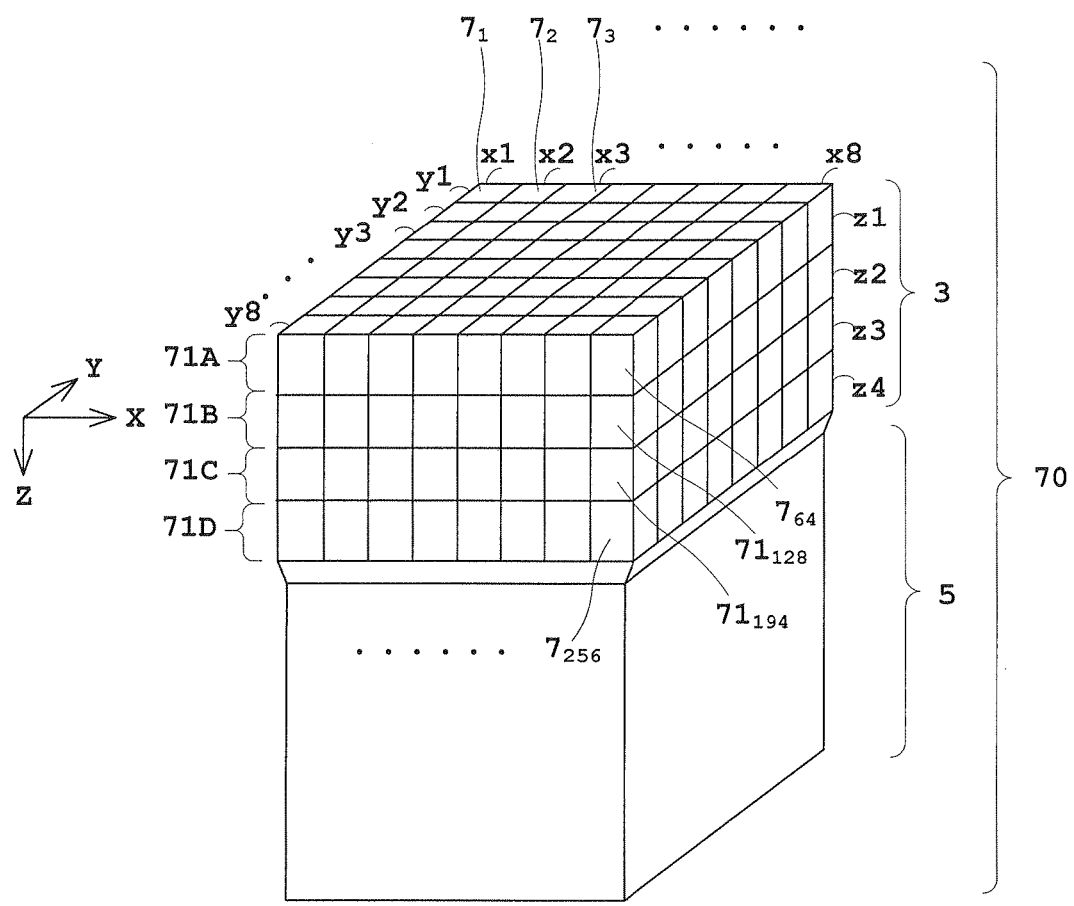
FIG. 9 is a schematic view of detector blocks provided for the radiation detector according to Embodiment 3.

Next, Embodiment 3 of this invention will be described with reference to the drawings. FIG. 8 is a block diagram showing an overall construction of a radiation detector which can add group position information to compressed pulse trains, where a plurality of detector cells form groups in the radiation detector according to Embodiment 3. FIG. 9 is a view showing a DOI detector having a plurality of detector cells 7 arranged two-dimensionally in X-direction, Y-direction and Z-direction.

Groups 71 constituting a DOI detector 70 will be described with reference to FIG. 9. While the DOI detector 70 basically employs a construction similar to the detector cell group 8 in Embodiments 1 and 2, the detector cells 7 are arranged in X-direction, Y-direction and Z-direction and have a four-layered structure of groups 71A, 71B, 71C and 71D. Group 71A has detector cells $7_1$ through $7_{64}$, group 71B has detector cells $7_{65}$ through $7_{128}$, group 71C has detector cells 7129 through $7_{194}$, and group 71D has detector cells $7_{195}$ through $7_{256}$. Each detector cell, for example, detector cell 71 has channel information (x=1, y=1, z=1), and $7_{256}$ (x=8, y=8, Z=4).

The overall construction of the radiation detector 1 according to Embodiment 3 will be described with reference to FIG. 8. Here, pluralities of detector cells 7 gather together to form groups 71A through 71D. Each group 71 includes detector cells 7, preamplifiers 9, metadata adders 15 and a compressor 17 which are similar to those in Embodiments 1 and 2, and will not be described. Downstream of each group 71 are a group address superposer 73 for superposing a group address on the output from each group 71, a group compressor 75 for compressing each output from the group address superposer 73, and a group decompressor 77 for decomposing the compressed output for each group 71. Downstream of the group decompressor 77 is, although not shown, a decompressor 19 for decompressing the output for each group to an output for each detector cell.

Each group 71 is a detector of each layer forming the DOI detector 70 having scintillators arranged in multiple layers in order to acquire information DOI (depth of interaction) in the depth direction of the scintillators. It may be a block detector for multiple ring PET having, for example, numerous block detectors arranged on a circumference, and a plurality of such a structure are arranged in the direction of a body axis.

The compressor 17 provided for each group 71 outputs to the group address superposer 73 a compressed pulse train Pc formed by compressing the incident position pulse train Pt outputted from each detector cell 7.

The group address superposer 73 superposes the position information of each group on the compression pulse train Pc outputted from each group 71. The compression pulse train Pc having the position information of each group superposed thereon is called group pulse train Pc1. The group address superposer 73 outputs the group pulse train Pc1 to the group compressor 75. The group compressor 75 compresses the group pulse train Pa of each group 71. This group pulse train Pa compressed is called group compression pulse train Pc2. The group compressor 75 outputs the group compression pulse train Pc2 to the group decompressor 77. The group address superposer 73 corresponds to the group position information adding device in this invention. The group compressor 75 corresponds to the group compression device in this invention.

The group decompressor 77 decompresses the group compression pulse train Pct to the compressed pulse train Pc of each group 71 according to the position information on the group dress. The group decompressor 77 outputs the compressed pulse train Pc decompressed to the decompressor 17. The decompressor 17 decompresses the compressed pulse train Pc to incident position pulse train Pt of each detector cell 7. The group decompressor 77 corresponds to the group decompressing device in this invention.

According to the radiation detector 1 in Embodiment 3, the group address superposer 73 adds the position information for each group 71 to the compression pulse train Pc to create a group pulse train Pc1. Therefore, in the radiation detector having the groups 71a through 71n formed of a plurality of detector cells 7, it is possible to detect easily which group 71 has outputted the incident position pulse train Pt which is the incident position pulse train Pt outputted from the metadata adder 15 provided for each group 71. As a result, when the radiation falls on the detector cells 7 forming the group 71, the positions of the detector cells receiving the radiation can be detected in a short time.

According to the radiation detector 1 in Embodiment 3, the group compressor 75 compresses group pulse trains Pc1 to create group compression pulse trains Pc2. Therefore, when the group compression pulse trains Pc2 are inputted to the group decompressor 77, they are decompressed back to the compressed pulse trains Pc. Therefore, in the radiation detector having the groups 71a through 71n formed of a plurality of detector cells 7, even when group pulse trains Pc1 are outputted from numerous groups 71, positions of the groups 71 from which the compressed pulse trains Pc are outputted can be detected in a short time.

Embodiment 4

Figure 10:
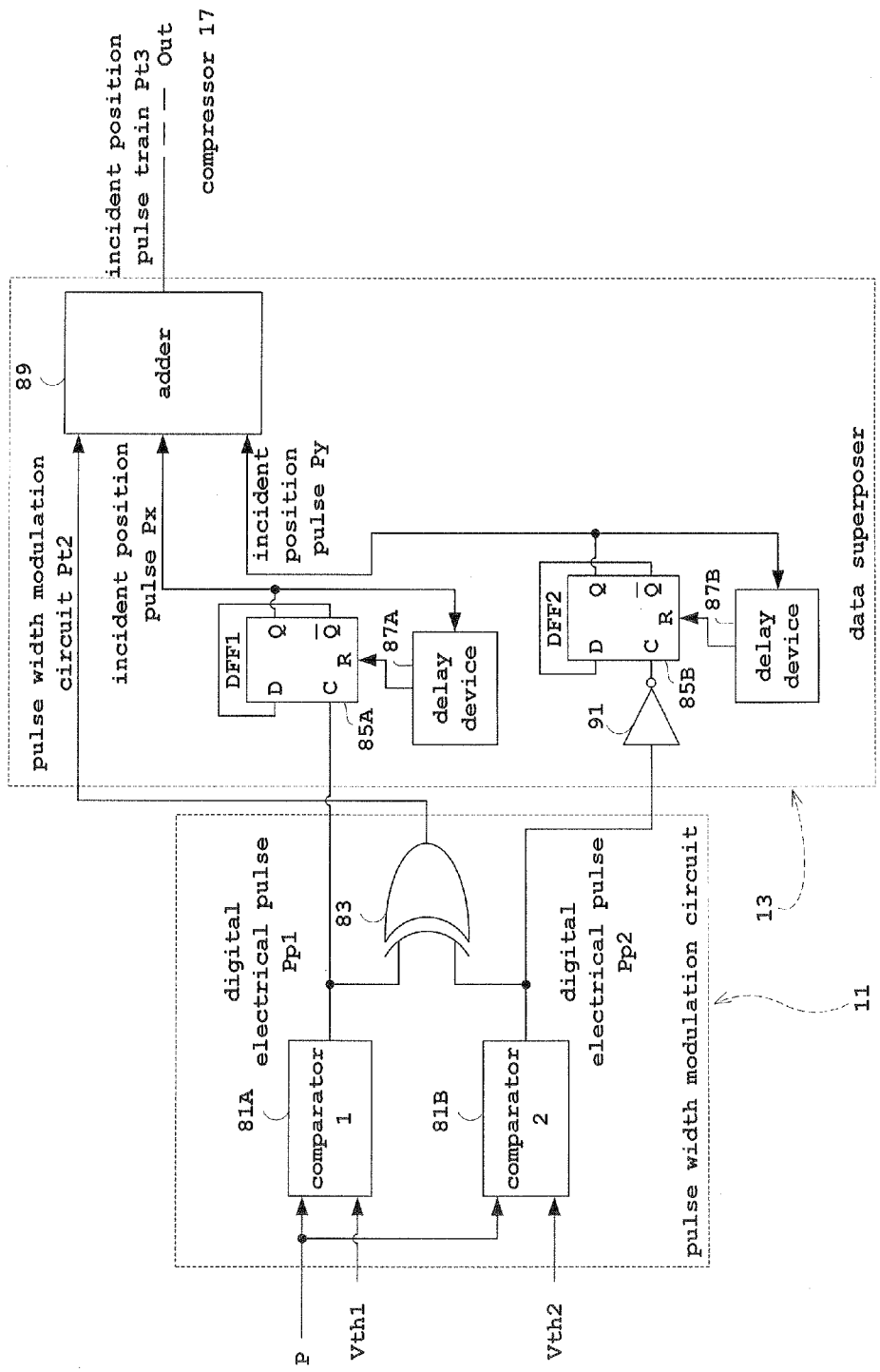
FIG. 10 is a circuit diagram of a pulse width modulation circuit and a data superposer provided for a radiation detector according to Embodiment 4.
Figure 11:
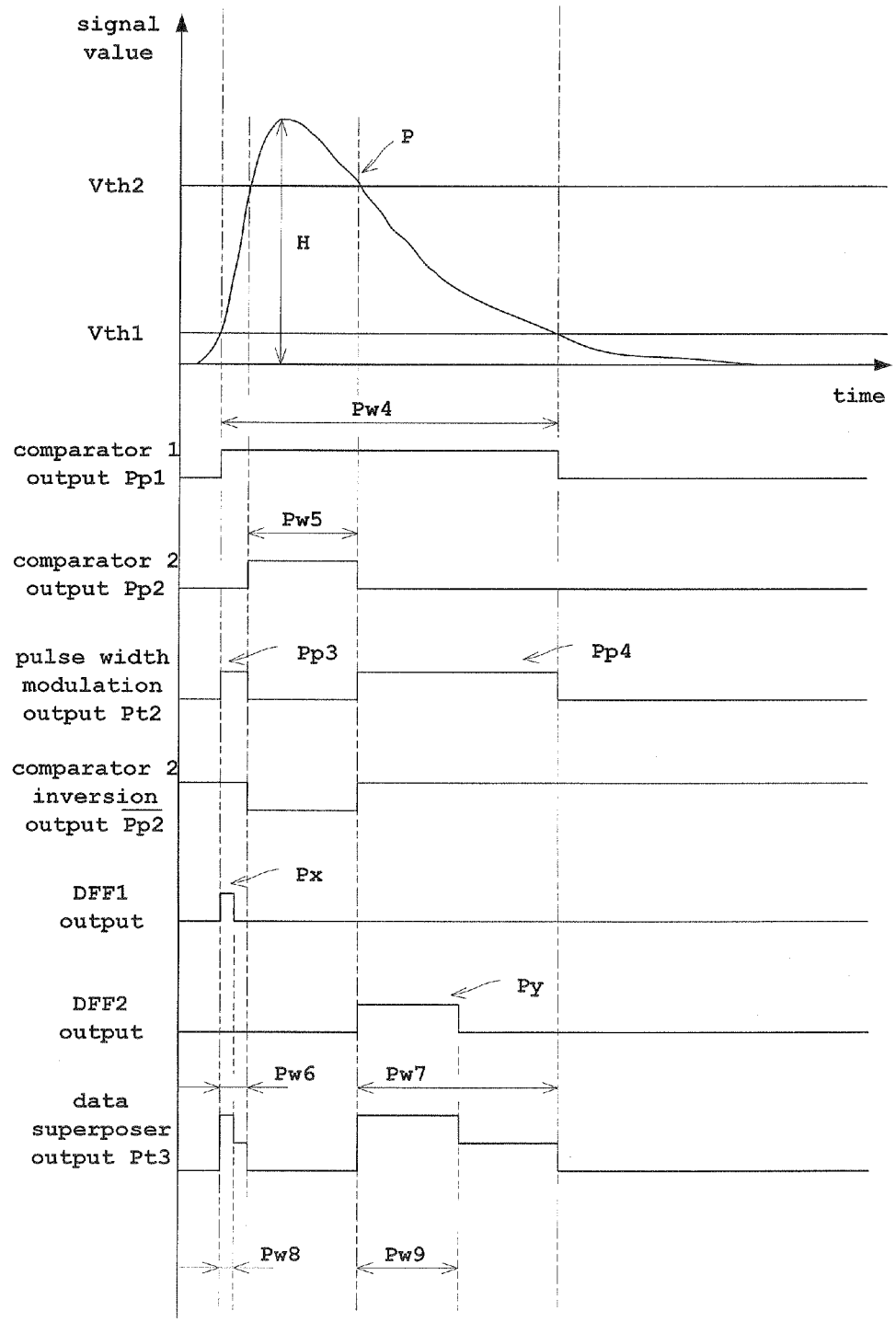
FIG. 11 is a timing chart of the pulse width modulation circuit and the data superposer according to Embodiment 4.

Next, Embodiment 4 of this invention will be described with reference to the drawings. FIG. 10 is a circuit diagram showing constructions of a pulse width modulation circuit and a data superposer, where more exact pulse crest values and timing information are acquired by using a plurality of threshold voltages in the radiation detector according to Embodiment 4. FIG. 11 is a timing chart of the pulse width modulation circuit and a data superposer according to Embodiment 4.

An overall construction of the radiation detector according to Embodiment 4 is approximately the same as the overall construction of the radiation detector according to Embodiment 1, but is different in having a pulse width modulation circuit 11 which binarizes each with a plurality of threshold voltages, and a data superposer 13 which uses a multivalued logic technique, instead of the pulse width modulation circuit 11 and data superposer 13 described in Embodiment 1.

The circuit diagram of the pulse width modulation circuit 11 and data superposer 13 will be described with reference to FIG. 10. The pulse width modulation circuit 11 is formed of two comparators 81A and 81B (shown as "comparator 1" and "comparator 2" in FIG. 10), and an XOR circuit 83 which is an exclusive OR circuit. The pulse width modulation circuit 11 corresponds to the pulse width modulating device in this invention.

Analog electrical pulse P is inputted to the comparators 81A and 81B. Next, the comparator 81A compares the analog electrical pulse P with threshold voltage Vth1, and outputs digital electrical pulse Pp1. The comparator 81B compares the analog electrical pulse P with threshold voltage Vth2, and outputs digital electrical pulse Pp2. The digital electrical pulse Pp1 outputted from the comparator 81A is inputted to the XOR circuit 83, while the digital electrical pulse Pp2 outputted from the comparator 81B is inputted to the XOR circuit 83. The XOR circuit 83 outputs incident position pulse train Pt2 having pulses Pp3 and Pp4.

The data superposer 13 is formed of two D flip-flops 85A and 85B (shown as "DFF1" and "DFF2" in FIG. 10), two delay devices 87A and 87B, an adder 89 and a NOT circuit 91. The NOT circuit 91 may be included in the pulse width modulation circuit 11, instead. The data superposer 13 corresponds to the position information adding device in this invention.

The digital electrical pulse Pp1 outputted from the comparator 81A is inputted to the clock input terminal of D flip-flop 85A. The NOT circuit 91 inverts the digital electrical pulse Pp2 outputted from the comparator 81B, and inputs the inverted pulse to the clock input terminal of D flip-flop 85B. The D flip-flop 85A outputs incident position pulse Px from the Q terminal. The D flip-flop 85B outputs incident position pulse Py from the Q terminal. Q terminal output of D flip-flop 85A is inputted to reset terminal R of D flip-flop 85A through the delay device 87A. Q terminal output of D flip-flop 85B is inputted to the reset terminal R of D flip-flop 85B through the delay device 87B. Incident position pulse train Pt2 outputted from the XOR circuit 83, and incident position pulses Px and Py outputted from D flip-flops 85A and 85B, are inputted to the adder 89. The adder 89 carries out an analog addition of these incident position pulses Pt2, Px and Py, and outputs incident position pulse train Pt3.

The timing of the pulse modulation circuit outputting the incident position pulse train Pt2 from the analog electrical pulse will be described, and the timing of adding position information to the incident position pulse train Pt2 will be described, with reference to FIG. 11. As is FIG. 2, FIG. 11 is a timing chart in which the vertical axis represents signal value and the horizontal axis time. Pp1 is the digital electrical pulse outputted from the comparator 81A (shown as "comparator 1 output" in FIG. 11). Pp2 is the digital electrical pulse outputted from the comparator 81B (shown as "comparator 2 output" in FIG. 11). Pt2 is the incident position pulse train outputted from the XOR circuit 83 (shown as "pulse width modulation output" in FIG. 11). Pp2 bar is the pulse inverted from the NOT circuit 91, and is the inversion signal of the digital electrical pulse Pp2 outputted from the comparator 81B (shown as "comparator 2 inversion output" in FIG. 11). DFF1 output is the incident position pulse Px outputted from the D flip-flop 85A. DFF2 output is the incident position pulse Py outputted from the D flip-flop 85B. Pw4 shows a pulse width when the digital electrical pulse Pp1 (comparator 1 output) is High. Pw5 shows a pulse width when the digital electrical pulse Pp2 (comparator 2 output) is High. Pw6 shows the pulse width of pulse Pp3. Pw7 shows the pulse width of pulse Pp4. Pw8 shows a pulse width when the incident position pulse Px is High. Pw9 shows a pulse width when the incident position pulse Py is High.

The comparator 85A compares the analog electrical pulse P with the threshold voltage Vth1, and outputs the digital electrical pulse Pp1, outputting High when the analog electrical pulse P is above the threshold voltage Vth1, and outputting Low when the analog electrical pulse P is below the threshold voltage Vth1. The comparator 85B compares the analog electrical pulse P with the threshold voltage Vth2, and outputs the digital electrical pulse Pp2, outputting High when the analog electrical pulse P is above the threshold voltage Vth2, and outputting Low when the analog electrical pulse P is below the threshold voltage Vth2. At this time, as shown in FIG. 11, the longer the time is when the voltage value of the analog electrical pulse P is above the threshold voltage Vth1, the longer becomes width Pw4 of output High of the digital electrical pulse Pp1 (comparator 1 output shown in FIG. 11) outputted from the comparator 85A. The longer the time is when the voltage value of the analog electrical pulse P is above the threshold voltage Vth2, the longer becomes width Pw5 of output High of the digital electrical pulse Pp2 (comparator 2 output shown in FIG. 11) outputted from the comparator 85B. Conversely, the shorter the time is when the voltage value of the analog electrical pulse P is above the threshold voltage Vth1, the shorter becomes the width Pw4 of output High of the digital electrical pulse Pp1 outputted from the comparator 85A. The shorter the time is when the voltage value of the analog electrical pulse P is above the threshold voltage Vth2, the shorter becomes the width Pw5 of output High of the digital electrical pulse Pp2 outputted from the comparator 85B. The greater the signal strength (voltage value) of the analog electrical pulse P is, the longer become the widths Pw4 and Pw5. The smaller the signal strength (voltage value) of the analog electrical pulse P is, the shorter become the widths Pw4 and Pw5. That is, the comparator 85A encodes the signal strength of the analog electrical pulse P into the pulse width Pw4, while the comparator 85B encodes the signal strength of the analog electrical pulse P into the pulse width Pw5.

The XOR circuit 83 carries out an EXCLUSIVE-OR operation of the digital electrical pulses Pp1 and Pp2 outputted from the comparators 81A and 81B, respectively, and outputs the incident position pulse train Pt2. That is, when the digital electrical pulse Pp1 and Pp2 are both High, or both Low, the incident position pulse train Pt2 outputted is Low. When one of the digital electrical pulses Pp1 and Pp2 is High and the other is Low, the incident position pulse train Pt2 outputted is High. In FIG. 11, when the digital electrical pulse Pp1 is High and the digital electrical pulse Pp2 is Low, pulse Pp3 is outputted until a rise of the digital electrical pulse Pp2, and pulse Pp4 is outputted upon a fall of the digital electrical pulse Pp2. Since threshold voltage Vth2>threshold voltage Vth1, whenever the voltage value of analog electrical pulse P is above the threshold voltage Vth2, it is above the threshold voltage Vth1. Therefore, when the digital electrical pulse Pp2 is High, which is also the time when the voltage value of the analog electrical pulse P is above the threshold voltage Vth2, the digital electrical pulse Pp1 is always High which is also the time when the voltage value of analog electrical pulse P is above the threshold voltage Vth1.

The spacing from the rise of pulse Pp3 to the fall of pulse Pp4 is pulse width Pw4, and the spacing from the fall of pulse Pp3 to the rise of pulse Pp4 is pulse width Pw5. As noted above, the pulse width of pulse Pp3 is Pw6, and the pulse width of pulse Pp4 is Pw7. The greater the signal strength (voltage value) of analog electrical pulse P is, the shorter become the widths Pw6 and Pw7. That is, the XOR circuit 83 encodes the signal strength of analog electrical pulse P into pulse widths Pw6 and Pw7. Thus, the pulse width modulation circuit 11 formed of the two comparators 81A and 81B and XOR circuit 83 encodes the signal strength of analog electrical pulse P into pulse widths Pw4, Pw5, Pw6 and Pw7.

The Q terminal of D flip-flop 85A rises synchronously with the rise to High of digital electrical pulse Pp1 outputted from the comparator 81A, which is reset to fall after lapse of a delay time Dx of the delay device 87A, and outputs the incident position pulse Px (DFF1 output in FIG. 11) with pulse width Pw8. The Q terminal of D flip-flop 85B rises synchronously with the rise of Pp2 bar outputted from the comparator 81B and inverted by the NOT circuit 91 (i.e. the fall of pulse Pp2), which is reset to fall after lapse of a delay time Dy of the delay device 87B, and outputs the incident position pulse Py (DFF2 output in FIG. 11) with pulse width Pw9. Next, the adder 89 carries out an analog addition of incident position pulses Pt2, Px and Py, and generates incident position pulse train Pt3 of multivalued logic (data superposer output in FIG. 11).

As does the delay generator 23 described in Embodiment 1, the delay device 87A outputs the delay signal Dx corresponding to one of the X-channel numbers of detector cells 7₁ through 7₆₄ outputting the analog electrical pulse P, and the delay device 87B outputs the delay signal Dy corresponding to one of the Y-channel numbers of detector cells 7₁ through 7₆₄ outputting the analog electrical pulse P. Thus, the pulse width Pw8 of incident position pulse Px and the pulse width Pw9 of incident position pulse Py forming the incident position pulse train Pt3 mean the X-channel number and Y-channel number of the detector cell 7 outputting the analog electrical pulse P, respectively. The pulse widths Pw6 and Pw7 of pulses Pp3 and Pp4 in the incident position pulse train Pt3, the time lag Pw4 from the rise of pulse Pp3 to the fall of pulse Pp4, and the time lag Pw5 from the fall of pulse Pp3 to the rise of pulse Pp4, vary with the size of analog electrical pulse P, and thus mean a crest value H of analog electrical pulse P. The rise and fall of incident position pulse train Pt3 mean the timing of radiation incident on the detector cell 7.

Although, this Embodiment 4, the D flip-flops are used for the data superposer 13 to generate Px and Py, other circuits may be used, such as CR and comparator circuits as shown in Embodiment 2.

According to the radiation detector 1 in Embodiment 4, the pulse width modulation circuit 11 includes two comparators 81A and 81B, binarizes the analog electrical pulse P with the predetermined threshold voltages Vth1 and Vth2 using these comparators 81A and 81B, respectively, and outputs the digital electrical pulses Pp1 and Pp2, respectively. This can acquire a more exact crest value and timing information. Thus, although one threshold voltage Vth is set for the pulse modulation circuit 11 in Embodiments 1 and 2, two or more threshold voltages are set in this Embodiment 4 to acquire a more exact pulse crest value and timing information. Of course, three or more threshold voltages may be set to acquire a more exact pulse crest value and timing information to be added to the incident position pulse train.

According to the radiation detector 1 in Embodiment 4, the data superposer 13 outputs the incident position pulse train Pt3 using the multivalued logic technique involving different pulse widths (widths along the time axis of pulses) and pulse amplitudes (widths along the voltage-axis of pulses). Consequently, through an analog addition of the pulses, an incident position pulse train Pt3 having different pulse widths and pulse amplitudes can be outputted.

This invention is not limited to the foregoing embodiments, but may be modified as follows:

(1) Each of the foregoing embodiments has been described, exemplifying a radiation detector 1 provided for a PET apparatus. The radiation detector 1 may be the type provided for a SPECT (Single Photon Emission Computed Tomography) apparatus.

(2) Foregoing Embodiments 1 and 2 have been described exemplifying the case of superposing incident position pulses Px and Py on the digital electrical pulses Pp. The incident position pulses Px and Py may be added after the digital pulses Pp are outputted.

(3) Foregoing Embodiments 1 and 2 assume that radiation for only one event is incident on one of the detector cells 7 connected to the same compressor 17. The event can take place with other detector cells 7 simultaneously or within a short time difference. In that case, a circuit may be added, which adds analog electrical pulses P from all the detector cells 7 beforehand, and when two or more signal levels are found, removes such signals.

INDUSTRIAL UTILITY

As described above, this invention is suitable, when detecting radiation with numerous detector cells, for detecting positions of the radiation incident on detector cells in a short time.

The invention claimed is:

1. A radiation detector having a plurality of detector cells which convert light emission by incidence of radiation into analog electrical pulses to detect the radiation, comprising a pulse width modulating device for binarizing the analog electrical pulses with a predetermined threshold, and outputting digital electrical pulses; and a position information adding device for outputting incident position pulse trains formed by adding information on positions of the detector cells on which the radiation falls to the digital electrical pulses,
wherein the position information adding device is arranged to output the incident position pulse trains synchronously with timing of the analog electrical pulses being above and timing of the analog electrical pulses being below the predetermined threshold.

2. The radiation detector according to claim 1, wherein widths of the pulses forming the incident position pulse trains are X-channel numbers and Y-channel numbers of the detector cells arranged in two dimensions consisting of X-direction and Y-direction.

3. The radiation detector according to claim 1, wherein widths of the pulses forming the incident position pulse trains are X-channel numbers, Y-channel numbers and Z-channel numbers of the detector cells arranged in three dimensions consisting of X-direction, Y-direction and Z-direction.

4. The radiation detector according to claim 1, wherein pitches of the pulses forming the incident position pulse trains are proportional to crest values of the analog electrical pulses.

5. The radiation detector according to claim 1, comprising a pulse train compressing device for compressing the incident position pulse trains and outputting compressed pulse trains, and a pulse train decompressing device for decompressing the compressed pulse trains back to the incident position pulse trains.

6. The radiation detector according to claim 5, wherein the pulse train compressing device is provided for each group formed of a plurality of the detector cells, the compressed pulse train being outputted for each group, the radiation detector comprising a group position information adding device for outputting, for each group, a group pulse train formed by adding information on a position of the group to the compressed pulse train outputted for each group.

7. The radiation detector according to claim 6, comprising a group compression device for compressing the group pulse train and outputting a group compression pulse train, and a group decompression device for decompressing the group compression pulse train to the group pulse train, and decompressing the group pulse train to the compressed pulse train.

8. The radiation detector according to claim 1, wherein the position information adding device includes a delay circuit (B) for outputting delay signals (A) outputted as corresponding to the information on positions of the detector cells, and a logic circuit (C) for outputting the incident position pulse trains when the electrical pulses and the delay signals (A) are inputted.

9. The radiation detector according to claim 8, wherein the logic circuit (C) is a logic circuit for outputting the incident position pulse trains, such that a first pulse forming each incident position pulse train falls synchronously with rises of the delay signals (A), and a second pulse forming each incident position pulse train falls synchronously with the falls of the delay signals (A), the first pulse and the second pulse being arranged in a row.

10. The radiation detector according to claim 1, wherein the position information adding device includes a delay circuit (E) formed of a capacitor having a capacity corresponding to the information on the positions of the detector cells, and a resistor having a resistance value, for outputting a delay signal (D), a comparator for outputting the pulses forming the incident position pulse trains when, upon comparison with the predetermined threshold, the delay signal (D) is above the predetermined threshold, and a logic circuit (F) for outputting the incident position pulse trains with an arrangement in a row of the pulses outputted from the comparator.

11. The radiation detector according to claim 6 wherein the group position information adding device includes a delay circuit (H) for outputting a delay signal (G) outputted as corresponding to the information on the position of the group, and a logic circuit (I) for outputting the group pulse train when the compressed pulse train and the delay signal (G) are inputted.

12. The radiation detector according to claim 11, wherein the logic circuit (I) is a logic circuit for outputting the group pulse train, such that one pulse forming the group pulse train falls synchronously with a rise of the delay signal (G), and a different pulse forming the group pulse train falls synchronously with a fall of the delay signal (G), the one pulse and the different pulse being arranged in a row.

13. The radiation detector according to claim 6, wherein the group position information adding device includes a delay circuit (K) formed of a capacitor having a capacity corresponding to the information on positions of the detector cells, and a resistor having a resistance value, for outputting a delay signal (J), a comparator (L) for outputting the pulses forming the group pulse train when, upon comparison with the predetermined threshold, the delay signal (J) is above the predetermined threshold, and a logic circuit (M) for outputting the group pulse train with an arrangement in a row of the pulses outputted from the comparator.

14. The radiation detector according to claim 1, wherein the pulse width modulating device includes a plurality of comparators, the respective comparators being used for binarizing the analog electrical pulses with predetermined thresholds, and outputting digital electrical pulses.

15. The radiation detector according to claim 1, wherein the position information adding device is arranged to output the incident position pulse trains using a multivalued logic technique involving different pulse widths and pulse amplitudes.

* * * * *